UNITED STATES PATENT OFFICE.

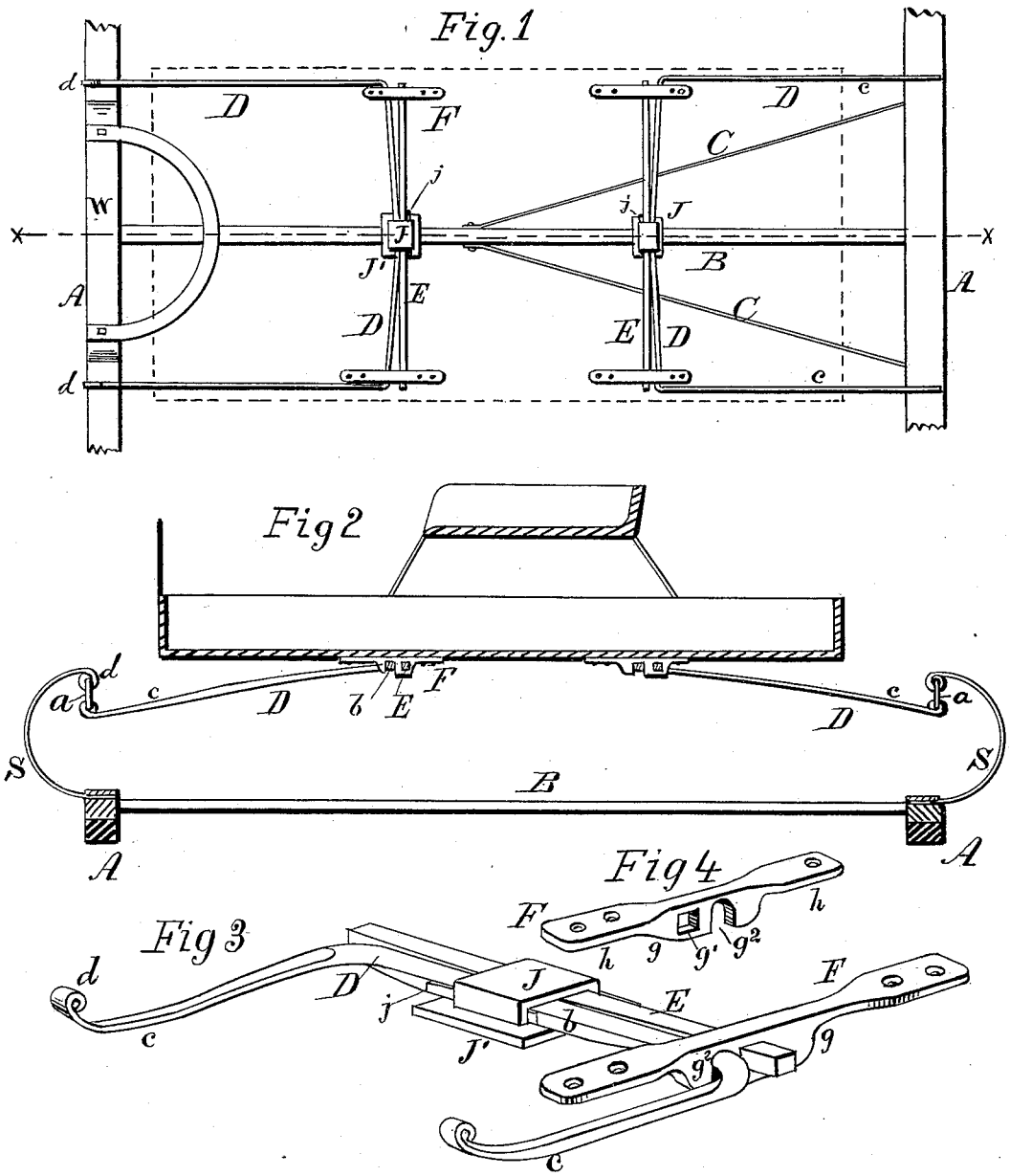

JAMES PERCY, OF CHICAGO, ILLINOIS.

VEHICLE-SPRING.

SPECIFICATION forming part of Letters Patent No. 428,628, dated May 27, 1890.

Application filed March 22, 1890. Serial No. 344,978. (No model.)

*To all whom it may concern:*

Be it known that I, JAMES PERCY, of Chicago, in the county of Cook and State of Illinois, have invented a new and useful Improvement in Vehicle-Springs; and I do hereby declare that the following is a full and exact description of the same, reference being had to the accompanying drawings, and to the letters of reference marked thereon.

My invention relates to certain novel and valuable improvements in springs which are especially designed for carts and buggies, but which are also applicable to other four-wheeled vehicles; and the nature of my invention consists in the combination of torsions, springs, and clips with C-springs, whereby side bars or axle-beds may be dispensed with and a substantial compound spring-vehicle be made at comparatively small cost, which will run lightly, as will be fully understood from the following description, taken in connection with the annexed drawings, in which—

Figure 1 is a top view of my improved running-gear. Fig. 2 is a vertical longitudinal section through Fig. 1, taken in the plane indicated by dotted line $x\ x$ thereon. Fig. 3 is a perspective view of a U-shaped spring and a torsion-spring clipped together and detached from other parts of the running-gear. Fig. 4 is a perspective view of one of the box-clips, or clip which is adapted for connecting the compound U-shaped and torsion spring to the box or body of the vehicle.

Referring to the annexed drawings by letter, A A designate, respectively, the front and the rear axles of a vehicle, B the perch connecting said axles, and C C the rear diagonal braces, which parts are made in the usual well-known manner and provided at the front part of the vehicle with the well-known arc or fifth-wheel segment G, as clearly shown in Fig. 1.

D D designate two U-shaped spring-supports, which are arranged nearly in horizontal planes and back to back. These supports are constructed substantially alike, and both are formed of round rods flattened or squared at the middle of their backs, as indicated at $b$, and having flattened tapered arms $c$, curved as shown, and terminated in eyes $d$, for a purpose hereinafter explained.

E E designate square bars of suitable length, which are slightly tapered from the middle of their length to their extremities, and which are rigidly secured to the squared parts $b$ of the U-shaped spring-supports by means of strong and broad clips J J, clip-plates J' J', and locking pins or bolts and screws, the said parts being tightened by transverse wedges $j$, driven between the clips and the said square bars E E. These bars constitute torsion-springs, in combination with the aforesaid U-shaped spring-supports.

F F designate my bed or box clips, which are, in fact, bracket-connections between the U-shaped supports, the torsion-bars, and the bed or box of the vehicle. These clips are made as shown in Figs. 2 and 4 of the annexed drawings, and are rigidly bolted to the floor of the vehicle-box, or to longitudinal sill-bars suitably secured to this box. Each clip F is constructed with a flange $g$, having a square aperture $g'$ through it, and a crotch $g^2$. The aperture $g'$ receives and holds the square end of the torsion-bar, the notch $g^2$ receives the rounded portion of the back of the U-shaped supporting-spring, and the two tapered tangs $h\ h$ receive bolts through them, which secure the clip to the vehicle-box floor. To the axle A are applied C-springs S, the upper ends of which are connected by links $a$ to the eyes $d$ on the rear ends of the arms $c\ c$ of the rear supporting U-shaped spring D. The front eyes of the side arms $c$ of the front U-shaped supporting-springs D' are connected by links to C-shaped springs S, which may be also jointed to the front spring-bar W.

It will thus be seen that the wagon body or box is sustained by the clip-brackets, the torsion-springs, the U-shaped spring-supports, and the C-shaped springs, which latter are connected to and sustained by the axles.

Having described my invention, what I claim as new, and desire to secure by Letters Patent, is—

The combination, with the front and rear axles, the perch and braces of a vehicle, of the U-shaped spring-supports, the torsion-bars, the clips connecting these bars to the said U-shaped supports, the bed-clips, and the C-springs connecting the supports to the axles, all as specified.

In testimony whereof I affix my signature in presence of two witnesses.

JAMES PERCY.

Witnesses:
EDW. F. THOMAS,
JAMES LYNCH.